United States Patent [19]

Strickland, Jr.

[11] 4,170,948
[45] Oct. 16, 1979

[54] APPARATUS FOR INJECTING FLUID IN SOIL

[76] Inventor: James R. Strickland, Jr., 233 Alta Mesa Dr., South San Francisco, Calif. 94080

[21] Appl. No.: 815,698

[22] Filed: Jul. 14, 1977

[51] Int. Cl.² .......................................... A01C 23/02
[52] U.S. Cl. ...................................... 111/7.1; 47/48.5
[58] Field of Search ................ 47/48.5; 239/101, 102, 239/389, 271, 276, 240, 242; 111/4, 6, 7.1, 7.2, 7.3, 7.4, 85, 7; 173/21, 55, 56; 172/40, 42; 81/52.3, 52.35; 74/87

[56] References Cited
U.S. PATENT DOCUMENTS

| 1,346,221 | 7/1920 | Liedtke | 74/87 |
| 1,855,647 | 4/1932 | Pottenger | 239/101 |
| 2,420,793 | 5/1947 | O'Connor | 366/124 |
| 2,743,083 | 4/1956 | Zublin | 175/56 |
| 3,026,827 | 3/1962 | Cunningham | 47/48.5 X |
| 3,076,513 | 2/1963 | Heapy | 175/55 |
| 3,278,325 | 10/1966 | Bergstrom | 427/163 |
| 3,405,669 | 10/1968 | Nimrick | 111/7.2 |
| 3,598,068 | 8/1971 | Rosendahl | 111/7.1 |
| 3,659,536 | 5/1972 | White | 111/7.1 |
| 3,774,556 | 11/1973 | Poll | 111/7.2 |
| 3,783,804 | 1/1974 | Platz | 111/7.4 |

FOREIGN PATENT DOCUMENTS 229072 10/1968 U.S.S.R. ...................................... 111/6

Primary Examiner—Edgar S. Burr
Assistant Examiner—James R. Feyrer
Attorney, Agent, or Firm—Flehr, Hohbach, Test, Albritton & Herbert

[57] ABSTRACT

An apparatus for injecting fluid in soil of the type comprising a hollow pipe which is pushed into the soil. The apparatus is connected to a fluid source such as a garden hose for the purpose of irrigating trees, garden plants, lawns or the like. A vibrator powered by fluid flow through the apparatus is attached to the pipe. The vibrator imparts a reciprocating force to the pipe which aids the user in penetrating the soil.

3 Claims, 3 Drawing Figures

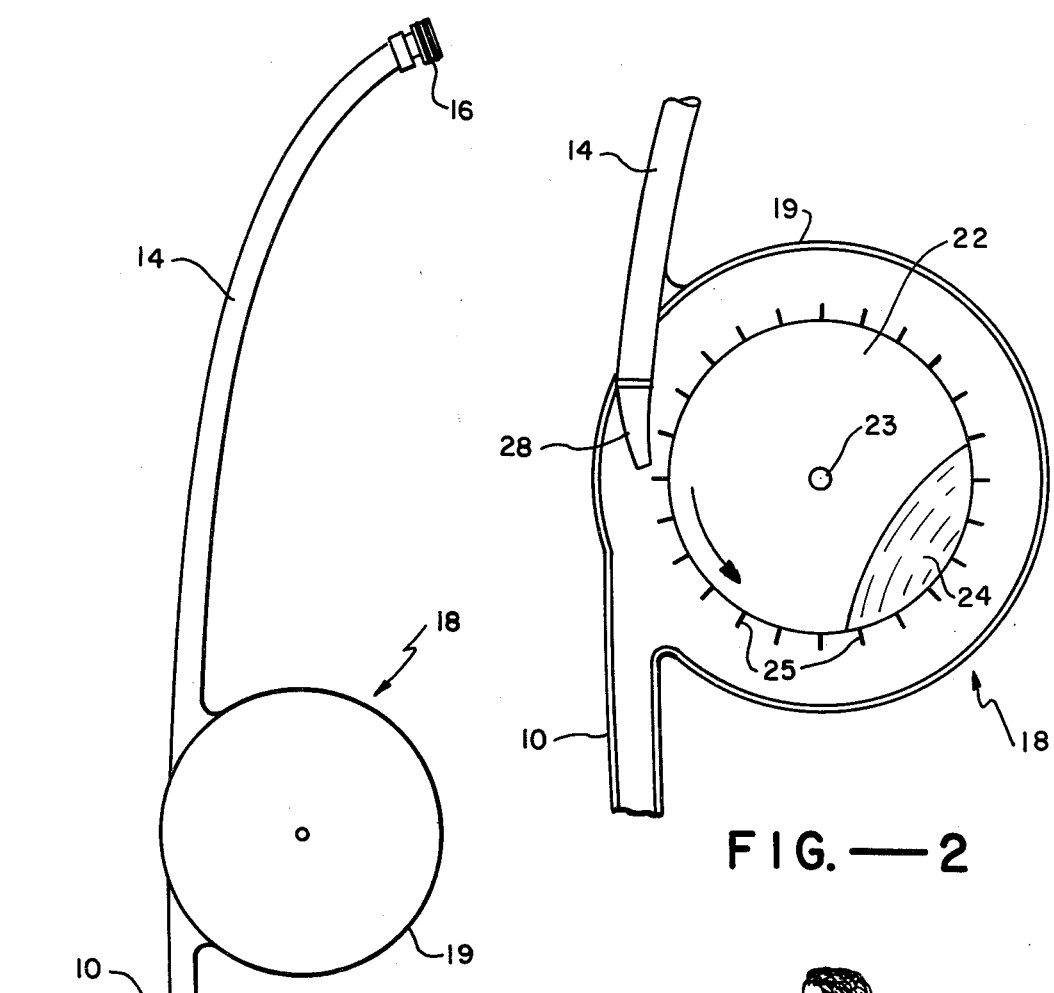
FIG.—2
FIG.—1
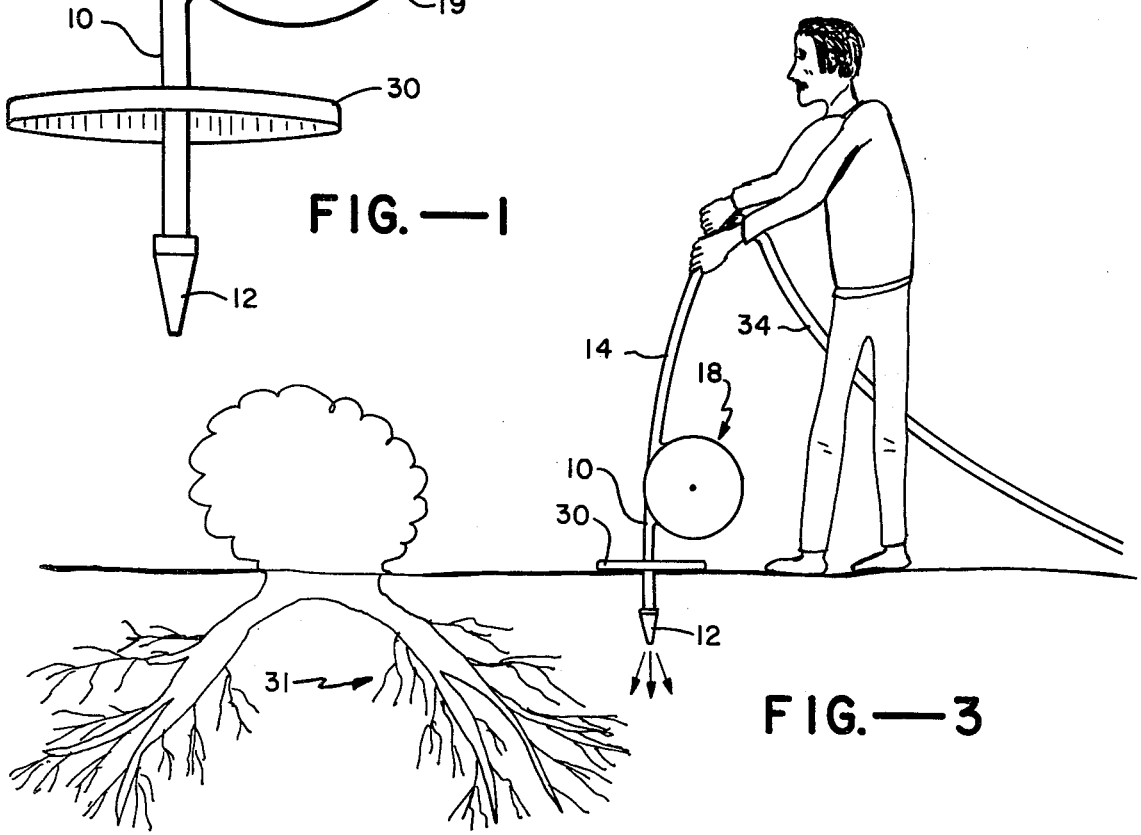
FIG.—3

APPARATUS FOR INJECTING FLUID IN SOIL

BACKGROUND OF THE INVENTION

The invention relates to an apparatus for injecting fluid in soil and more particularly to such an apparatus for use in the subsurface irrigation of soil.

Gardeners and homeowners recognize the effectiveness of direct injection of water into the soil for irrigating trees, shrubs and other plants. Water treated with nutrients can also be injected to feed the root systems of such plants. Direct injection allows for accurate control over the amount of water provided, supplies the water directly to the root systems, and avoids water waste.

The simplest type of prior art soil injectors comprise a pipe which is attached to a garden hose or other fluid source and which is simply forced into the ground. Such devices are difficult to insert in all but the loosest soils and often must be driven into position with a hammer or the like.

To facilitate insertion of a pipe into soil for fluid injection various systems have been developed to drive the pipe. One such system used to inject pesticides in soil for the purpose of extermination is disclosed in U.S. Pat. No. 3,774,556. That system employs an electric drill to rotate a cutting bit at the end of the pipe. Another system is shown in U.S. Pat. No. 3,783,804 which discloses the use of an electric impact hammer for driving the pipe into the soil. Still other devices rely on their weight or exterior bracing to drive the pipe.

While these systems accomplish their purpose of inserting a pipe for injecting fluid in soil, they are generally unsuitable for home subsoil irrigation. This is because irrigation is preferably accomplished by a series of short injections in which the fluid-injection pipe is repeatedly forced into the soil for a short time and then withdrawn and moved to a new location. The simple pipe device which is inserted by hand cannot be conveniently employed for repeated insertions because of the difficulty of making each insertion. On the other hand, the motor-assisted devices are too expensive for the average home gardener and have the associated problems of the separate power cord and consequent shock hazard. Devices which rely on their weight or external bracing are necessarily inconvenient to maneuver and are therefore unsuitable for making a series of short injections.

OBJECTS AND SUMMARY OF THE INVENTIONS

It is therefore an object of this invention to provide a portable soil-injection apparatus which can readily be inserted in soil.

Another object of the invention is to provide such apparatus which includes means for imparting reciprocation to the soil penetrating pipe.

Still another object of the invention is to provide such an apparatus in which the reciprocation means is powered by the flow of fluid through the device.

Accordingly, an apparatus is provided for injecting fluid from a fluid source into soil having a pipe with a first end insertable in soil. Vibrating means are attached to the pipe. A fluid passageway through both the pipe and the vibrating means carries fluid from the fluid source to the pipe for discharge by way of the first end thereof. The vibrating means is caused to vibrate by fluid flow therethrough to impart reciprocation to the pipe.

BRIEF DESCRIPTION OF THE DRAWINGS

FIG. 1 is a plan view of the apparatus of the invention.

FIG. 2 is an enlarged cut-away view of the vibrator portion of the apparatus.

FIG. 3 is a view of the apparatus in use irrigating soil.

DETAILED DESCRIPTION OF THE PREFERRED EMBODIMENT

Referring to FIG. 1, the apparatus of the invention is shown generally to comprise a pipe 10, a first end 12 of which is insertable in soil. An upper portion 14 of the pipe includes means for connecting the pipe to a fluid source by means of hose fitting 16 suitable for interconnection with a garden hose or the like.

The overall length of the pipe is such that it is convenient for the user to push end 12 into the ground without undue bending or stooping. The upper end of the pipe adjacent connector 16 is preferably curved to provide a suitable handle for gripping the apparatus.

Attached to the pipe along its length is vibrating means 18. The vibrator 18 includes a substantially water-tight housing 19 through which the water or other fluid flowing through the pipe is constrained to pass. Referring to FIG. 2, housing 19 has a substantially open exterior in which a rotatable member 22 is free to rotate on axis 23. Member 22 is in the form of a wheel with off-center weight 24 attached thereto. Such a construction provides an asymmetrical mass distribution relative to axis 23 causing vibration when the wheel is rotated rapidly. The outer periphery of wheel 22 includes a series of protruding members 25 in the form of suitable blades 24. The blades intercept the flow of water through housing 19 thereby causing wheel 22 to be rotated. End 28 of the upper portion 14 of the pipe is preferably in the form of a nozzle which increases the rate of fluid flow and directs the fluid against blades 25 to rapidly rotate wheel 22. In that way vibrator 18 is caused to vibrate by the fluid flow through the apparatus.

First end 12 of pipe 10 is preferably tapered to facilitate penetration into soil. As shown in FIG. 1, end 12 forms a nozzle which discharges fluid from the end. The discharged fluid aids in penetrating soil. Alternatively, end 12 could be formed of a suitably tapered piece of fluid-permeable material or have holes formed in the sides to discharge the fluid radially. End 12 is exposed to wear and should be formed of a material of considerable strength.

Proximate to end 12 on pipe 10 is splash shield 30. Shield 30 is preferably dish-shaped with the pipe extending through the center. The shield prevents fluid being injected into the soil from coming up the side of the pipe and striking the user. It is recommended that the shield be formed of a heavy material which will improve the balance of the apparatus and prevent excessive shaking during use.

Operation and use of the apparatus is illustrated in FIG. 3. If the apparatus is to be used to irrigate roots 31 of a plant it is first interconnected with a fluid source such as garden hose 34. As the water flows though vibrator 18 it rapidly rotates wheel 22 which sets up a reciprocating force in pipe 10. The user simply grasps the apparatus and directs it downwardly into the soil. By guiding the apparatus and imparting a slight downward pressure the pipe readily penetrates the soil. Vibrator 18 causes a "jack hammer" effect which aids penetration. Once fully inserted with shield 30 resting on the ground, the user simply holds the apparatus in place. The shield protects the user from any "back-up" spray. After a short period the pipe is withdrawn and reinserted elsewhere.

The apparatus harnesses the continuous flow of water employed in irrigation to reciprocate the injection pipe. It thereby aids soil penetration without the need for an independently-powered motor.

While a preferred form of the invention has been shown and described, alternative forms are possible within the scope of the invention. Other means could be provided for imparting vibration using fluid-flow. A water-wheel within a housing could be employed to reciprocate an external weight, for example. The vibrating means could also be disengageable to provide the apparatus with a non-vibrating mode if longer periods of irrigation are desired at a single spot. Shield 20 could be made adjustable on pipe 10 to permit selection of the insertion depth. If nutrients are added to the water the apparatus can be employed to feed the roots of plants. Similarly, the apparatus could be used to inject fluids other than water into soil.

A soil-injection apparatus has been provided which is both portable and can readily be inserted in soil. The apparatus imparts reciprocation to the soil-penetrating pipe and the reciprocation is powered by the flow of fluid through the device.

What is claimed is:

1. A hand held soil injection device for irrigation purposes, comprising: a pipe having end insertable in soil and a second end for receiving fluid, a substantially watertight housing attached to said pipe, a rotable member positioned in said housing and having an axis of rotation substantially perpendicular to the axis of said pipe, said rotatable member having an asymmetrical weight distribution relative to said axis of rotation whereby a reciprocating motion is imparted through said housing to said pipe when said rotatable member is rotated, said pipe and housing together constituting a fluid flow path which is never totally blocked so as to provide an unobstructed fluid passageway therethrough for receiving fluid from a source of fluid and transmitting the same to said first end of the pipe, means for connecting said second end of said pipe to said fluid source and for initiating a flow of fluid through said pipe for discharge from said first end, means powered by said flow of fluid for rotating said rotatable member at a substantially uniform rate, and laterally extending means forming a shield at said first end of the pipe to prevent splashing of fluid being injected into soil.

2. A soil injection device as in claim 1 wherein said pipe has a substantially linear axis adjacent said first end but has a slightly curving axis adjacent said second end to thereby facilitate manipulation as a soil injection device for irrigation purposes.

3. In a hand held soil injection device for irrigation purposes, a pipe having a first end insertable in soil and a second end for receiving fluid, vibrating means attached to said pipe, said vibrating means including a rotatable member having an axis of rotation and an asymmetrical mass distribution relative to said axis of rotation, a fluid flow path through both said pipe and said vibrating means which is never totally blocked so as to thereby provide a passageway for receiving and transmitting fluid from a fluid source through said vibrating means and pipe to said first end of said pipe, said fluid flow path including a substantially watertight housing attached to said pipe and within which said rotatable member is disposed, said rotatable member being rotatable at a substantially uniform rate by fluid flow in said fluid passageway, said rotatable member additionally including protuding members around the periphery thereof for intercepting fluid passing through said housing and said fluid flow path to thereby cause rotation of said rotatable member, said fluid flow path through said housing and vibrating means being generally constructed to permit a substantially unvarying and continuing flow of fluid therethrough for discharge from said pipe, said vibrating means being powered by the flow of fluid through said fluid flow path and imparting a reciprocal penetrating motion to said pipe.

* * * * *